3,328,371
CHLORINATION OF POLYVINYL CHLORIDE
Ludwig A. Beer, Agawam, Mass., assignor to Monsanto
Company, a corporation of Delaware
No Drawing. Filed Dec. 19, 1963, Ser. No. 331,942
10 Claims. (Cl. 260—92.8)

The present invention relates to an improved process for the post-chlorination of polymeric vinyl resins and more particularly to a process for the post-chlorination of vinyl chloride resins.

Rigid and semi-rigid compositions of vinyl chloride and its related copolymers and interpolymers have recently become of increasing importance in preparing rigid and semi-rigid sheets, tubes, and molded objects having high impact resistance. These compositions are characterized by good flow properties at relatively low processing temperatures in addition to excellent chemical and solvent resistance. These latter properties as well as its high resistance to ultraviolet radiation have made polyvinyl chloride resins excellent for many outdoor applications such as corrugated and flat roofing, siding, etc. The vinyl chloride resins have, however, suffered a major disadvantage in some applications due to their relatively poor heat distortion properties. It has been found in the past few years that all the above-mentioned properties inherent in unplasticized polyvinyl chloride may be retained, and, in addition, increased tolerance for high temperature, including outstanding resistance to decomposition by heat, materially increased softening temperatures, and greater dimensional stability may be imparted to polyvinyl chloride by post-chlorinating the resin in any of several well-known procedures.

These prior art procedures for post-chlorination of polyvinyl chloride resins include, for example the photochlorination of polyvinyl chloride resins in aqueous suspension or dispersed in an organic solvent using actinic light as a source of illumination. This procedure has found limited utility in commercial operations due to the difficulties encountered in maintaining a uniform chlorine concentration, particularly while exposing an aqueous resin dispersion in the absence of organic solvents to illumination. Non-uniform chlorination and inordinate cost requiremets due to the necessity for employing specialized equipment to achieve and maintain the necessary illumination intensity with the opaque resin slurries have severely limited the photochlorination technique as a commercial process.

Post-chlorination has also been carried out under high temperatures and pressures in the presence of a swelling agent containing a chlorinated hydrocarbon having at least 1 hydrogen atom. This process, described and claimed in U.S. 3,100,762, though useful cocmmercially, requires substantial pressure in order to provide sufficient chlorination of the resin within a commercially feasible time. Chlorination under high pressure in organic solvents has been found to be impracticable for several reasons. The chlorinated resin becomes increasingly soluble with increasing chlorine content and at higher temperatures, thereby causing recovery problems. Furthermore, when chloination is carried out in a chlorinated or fluorochlorinated hydrocarbon, hydrogen chloride liberated in the process must be vented continuously due to its low solublity in these solvents.

Numerous other processes have been proposed for the post-chlorination of polyvinyl chloride and other polymers; however, none of these have found complete commercial acceptance due to the difficulties encountered in attempting to scale-up to production level and because of deleterious effects on product quality.

It has been found in accordance with the present invention that by the use of an oil soluble acyl persulfonate catalyst, a chlorinated polyvinyl chloride resin may be produced in the dark in high yields by a controllable process which satisfies all the requirements for a commercial operation. Since the rate of chlorination can be largely varied and easily controlled by initiator concentration, initiator activity and temperature, chlorination of polyvinyl chloride resins can be carried out in conventional equipment similar to that used for polymerization reactions. Chlorination rate is limited only by the capabilities of the equipment to remove the heat of the exothermic reaction. Agitative intensity is not critical for this procedure as is the case for photochlorination, but merely serves to keep the resin particles dispersed and facilitate heat transfer and chlorine absorption. The persulfonate initiator may be added at the start of the reaction or in portions during chlorination. To achieve a uniform rate of chlorination throughout the reaction, it has been found advantageous to add the initiator continuously and in incremental quantities. The addition rate may be controlled in such a way as to maintain a constant temperature in the reactor by means frequently used in polymerization techniques.

The product obtained by chlorinating polyvinyl chloride in the presence of an acyl persulfonate is appreciably superior in tensile strength at yield and failure, in flexural strength, and in creep resistance at all temperatures, to the corresponding unchlorinated polymers. In addition, chlorinated polyvinyl chloride produced in accordance with this invention is less notch-sensitive than polyvinyl chloride as evidenced by Izod and tensile impact test.

It is, therefore, an object of this invention to provide a process for preparing a chlorinated polyvinyl chloride resin by post-chlorinating polyvinyl chloride in the presence of an acyl persulfonate.

It is a further object of this invention to provide a process for chlorinating polyvinyl chloride as an aqueous dispersion of the resin or as a dispersion of the resin in a chlorinated hydrocarbon swelling agent in the presence of an acyl persulfonate.

It is a further object of this invention to provide a process for preparing a post-chlorinated polyvinyl chloride in the absence of light and at moderate temperatures and pressures.

It is a still further object of this invention to provide a process for preparing a post-chlorinated polyvinyl chloride at low pressures within commercially feasibly chlorination periods suitable for commercial use.

It is a further object of this invention to provide the art with a polymeric material having outstanding heat stability properties and softening temperatures prepared by a simple and inexpensive procedure.

It has been found that chlorination can be achieved at a fast rate in the dark without degradation of the polymer molecule if chlorination is carried out either in a dispersion of the resin in a chlorinated hydrocarbon or in aqueous dispersions of the resin in the presence of a chlorinated hydrocarbon.

The chlorination of polyvinyl chloride, preferably in the form of porous suspension resins, is carried out in the presence of an acyl persulfonate having the structure $$R-SO_2-O-O-R'$$

wherein R is a saturated hydrocarbon radical having from 5 to 18 carbon atoms and R' is an acyl radical having from 2 to 5 hydrocarbons. The saturated hydrocarbon radicals useful as substituents in the catalyst include alkyls such as pentyl, hexyl, heptyl, decyl, dodecyl, hexadecyl, octodecyl, etc., and the corresponding isomers thereof; and cycloalkyls such as cyclopentyl, cyclohexyl, decahydronaphthyl, etc. The term saturated hydrocarbon is also intended to include alkyls and cycloalkyls having substituted halogen, hydroxyl, alkoxy, carboxyl, amine, nitro, or sulfate groups such as chloropentane, cyclobutyl chloride, cyclohexanol, lauryl alcohol, ethylcapronate, din-butyl ether, hexahydrobenzoic acid, etc. It is necessary, however, that no saturation be present in the chain. The acyl substituents may be of any of the saturated acyl radicals having from 2–5 carbon atoms such as acetyl, propionyl, n-butyryl, isobutyryl, n-valeryl, isovaleryl, pivalyl, etc. Of these, the acetyl group has been found to be most useful due to the ease in the preparation of the persulfonate from its corresponding acetic anhydride.

Acetyl cyclohexane persulfonate is preferred as catalyst. This compound may be prepared by the method described in the Annalen der Chemie, volume 578, pages 50 et seq. (1952).

The use of acetyl cyclohexane persulfonate and the other acyl persulfonates disclosed above has been found to contribute high chlorination speeds in relation to other conventional catalysts with a smaller quantity of catalyst required. Faster chlorination cycles are obtained while simultaneously producing a chlorination product which is decidedly superior in resistance to decomposition by heat. This highly desirable performance is due to the reduced amount of catalyst residue remaining in the product when compared to conventional initiators. The quantity of catalyst can be advantageously varied between 0.01 to 0.3% by weight of the resin depending on the temperature and the rate of chlorination desired. Optimum catalyst performance producing a resin of outstanding thermal stability can be obtained in the preferred range of 0.05–0.15%.

Any of numerous chlorinated hydrocarbons may be used, for example, methylene chloride, chloroform, carbon tetrachloride, dichloroethane, tetrachloroethane, chlorobenzene, tetrachlorodifluoroethane (Freon 112), etc. Of these chlorinated hydrocarbons, carbon tetrachloride has been found to be most suitable since chlorinated hydrocarbons containing hydrogen atoms are more likely to be chlorinated at least in part themselves, thereby requiring distillation before reuse, or in some cases, discarding of the solvent. Additionally, it may be difficult to free the resin of solvent if the conversion product increases in boiling point or solvating power for the chlorinated product. Accordingly, carbon tetrachloride is the preferred solvent due to its commercial availability, low cost, non-flammability, and its inertness to chlorine. Carbon tetrachloride has a sufficiently low vapor pressure to minimize carryover with off-gas if the reaction is carried out at atmospheric pressure, yet has a boiling point sufficiently low to be stripped by steam distillation. Carbon tetrachloride swells the polymer molecule thereby making the molecule more readily accessible to chlorination, but does not dissolve the polymer. The swelling action of carbon tetrachloride on the resin particles facilitates a more homogeneous chlorination, yet permits a high chlorine concentration in the immediate vicinity of the resin and acts as a reservoir to reduce the danger of chlorine starvation.

The chlorinated hydrocarbon is also the carrier for the acyl persulfonate initiator.

The acyl persulfonate initiators may, if desired, be combined with a conventional oil soluble free radical initiator such as lauroyl peroxide or azoisobutyrodinitrile. It has been surprisingly found that water soluble peroxides, though useful in the polymerization of vinyl chloride fail to produce any advantageous results when used as initiators in the post-chlorination of polyvinyl halides in aqueous dispersion.

A fast rate of chlorination of the polyvinyl chloride resin can be achieved using aqueous dispersions in the presence of chlorinated hydrocarbons containing acyl persulfonates in solution. The chlorinated hydrocarbon solvent may be preferably present in amounts of 10% to 100% by weight of solvent based on resin weight with optimum conversion rates being obtained at about 50% to 60% by weight of solvent. It has been found that the aqueous system may be run at high slurry solids while yielding resin having no change in original particle structure. This retention of particle porosity and pore volume is highly advantageous when adding liquid processing aids such as stabilizers, for example, since more uniform preblends for compounding are possible.

For complete utilization of chlorine and off-gas free operation in aqueous suspension, the reaction may be carried out at slightly elevated pressures, e.g., at from 1–20 p.s.i.g., since the by-product, hydrogen chloride dissolves in water or dilute hydrochloric acid. Operation at superatmospheric pressure also ascertains saturation of the suspension with chlorine, permitting control of chlorine addition rate and preventing chlorine starvation of the reaction mixture with its detrimental effect on product quality.

It is, of course, possible to operate at substantially greater pressure; however, it has been found to be entirely unnecessary when chlorination is carried out using the acyl persulfonate initiators of this invention. No particular advantages of operating at elevated pressure are apparent if chlorination is carried out in organic dispersion, since the liberated hydrogen chloride has to be vented frequently due to its low solubility in chlorinated or chloro-fluorinated hydrocarbons.

As initial charge, either water or dilute hydrochloric acid may be used as dispersing medium if chlorination is carried out in aqueous suspension. If desired, the acid recovered after filtration of the chlorinated resin may be reused until a more highly concentrated hydrochloric acid is obtained that can be used fo other operations. The aqueous resin slurry from the polymerization reactor after suspension polymerization of vinyl chloride can also be used directly without prior drying of the resin.

The persulfonate initiator by itself or a combination of the persulfonate with other oil soluble, free radical initiators may be charged initially, preferably as a solution in carbon tetrachloride, before the reaction mixture is raised to the chlorination temperature or be added in portions or continuously to maintain a constant rate of chlorination.

The reaction is preferably carried out at temperatures ranging between 25° C. and 60° C., with optimum conversion rates being produced at between 50° C. to 55° C. In organic dispersion, such as carbon tetrachloride, the chlorination temperature may also be advantageously kept below 50° C. to minimize swelling and solvation of the resin particles.

The products obtained by chlorination of polyvinyl chloride in organic or aqueous dispersion using acyl persulfonate initiators are essentially equivalent in physical characteristics to those obtained by other chlorination procedures and are far superior to the unchlorinated resin, particularly in regard to heat resistance. The mechanical properties of post-chlorinated polyvinyl chloride with approximately 65% chlorine are markedly superior to that of the unchlorinated resin as evidenced by its tensile and flexural strength at 100° C. The chlorinated product has a yield strength of up to 2300 p.s.i. and a fail strength of up to 4000 p.s.i., while unchlorinated polyvinyl chloride is much too soft at this temperature to even be tested. Creep resistance of chlorinated polyvinyl chloride made in accordance with this invention is outstanding. Samples of chlorinated resins did not fail within 1,000 hours at 6500 p.s.i. stress. At this stress, unchlorinated polyvinyl chloride will fail within 3 hours at room temperature.

The following examples are presented as illustrations but are not intended to be limitations of the above-described invention in order to more clearly illustrate the more novel features of the invention.

*Example I*

In a 2 liter glass reactor, shielded from light and equipped with agitator, condenser, gas-dip tube, and sampling device, 200 grams of polyvinyl chloride (granular, microporous polyvinyl chloride suspension resin Opalon 660, made by Monstanto Chemical Company, having an intrinsic viscosity of 1.11) are dispersed in 800 ml. water in the presence of 70 grams of carbon tetrachloride (35% by weight of resin) and 0.20 gram of acetyl cyclohexane persulfonate (0.1% by weight of resin) at room temperature. After a nitrogen purge to remove oxygen from the reactor, chlorine gas is added through an immersed sparger at a flow rate of 2.45 ml./min./gram polyvinyl chloride.

After saturation of the reaction mixture with chlorine as indicated by amount and color of off-gas, the temperature is raised to 50° C. and kept there with the aid of a thermostatically controlled water bath under mild agitation (80 r.p.m.) of the reactor contents. Samples are taken at 30 minute intervals for determination of chlorine content by pyrolysis and density measurements.

The results for three individual runs at the same conditions were found to be as follows:

| Chlorination Time, minutes | Percent Chlorine in Resin of Batch— | | |
|---|---|---|---|
| | #1 | #2 | #3 |
| 30 | 58.5 | 58.3 | 59.7 |
| 60 | 60.4 | 60.8 | 61.7 |
| 90 | 61.6 | 61.9 | 62.6 |
| 120 | 62.2 | 62.6 | 63.2 |
| 150 | 62.8 | 63.2 | 63.6 |
| 180 | 63.2 | 63.7 | 64.0 |

A compression molded sample of the resin containing 64.0% chlorine had a heat distortion temperature of 107° C. under 264 p.s.i. fiber stress (ASTM D648–56).

*Example II*

200 grams of a polyvinyl chloride suspension resin as in Example I are dispersed in 800 ml. of carbon tetrachloride in a 2 liter reactor. After passing nitrogen through the reactor to remove oxygen, dry chlorine gas is added through a flowmeter at a rate of 3.50 ml./min./g. polyvinyl chloride while the temperature is raised to 50° C. After saturation of the solvent with chlorine, 0.2 gram (0.0011 mole/liter) of acetyl cyclohexane persulfonate are added. The temperature is maintained at 50° C. while chlorine gas is added at such a rate that the released hydrogen chloride is essentially free of it. Samples are taken after 60 minutes and 105 minutes chlorination time. The swollen resin particles were separated from the solvent by filtration, washed with carbon tetrachloride, rewashed with methanol and dried. The results of an analysis of the samples is shown in the following table:

| Sample | Reaction Time, minutes | Density at 25° C. | Percent Cl | Intrinsic Viscosity |
|---|---|---|---|---|
| 1 | 60 | 1.5544 | 65.8 | 1.06 |
| 2 | 105 | 1.6168 | 69.8 | 1.07 |

A sample of the resin with 65.8% chlorine content was sheeted after addition of 2 p.p.h. dibutyl tin maleate on a two roll mill at 125–185° C.

The heat distortion temperature of 0.25 x 0.5 x 4 inch samples molded at 195–200° C., as measured in accordance with ASTM D648–56 was found to be as follows:

| 10 mil Deflection at— | | |
|---|---|---|
| 66 p.s.i. | 132 p.s.i. | 264 p.s.i. |
| 125° C. | 123° C. | 121° C. |

*Example III*

200 grams of polyvinyl chloride suspension resin are dispersed in 800 ml. of 22.6% hydrochloric acid in the presence of 150 grams of carbon tetrachloride (75% by weight of resin). After saturation with chlorine gas, the dispersion is kept at 45° C. under agitation and exclusion of light. 0.16 gram of acetyl methyl cyclohexane persulfonate are added as a 20% solution in $CCl_4$ and the chlorine flow rate kept at 500 ml. per minute. After 1 hour the resin is filtered, washed with water and methanol and dried at 60° C. under reduced pressure. The chlorine content of the resin increased to 65.5% during the 1 hour reaction time.

*Example IV*

At the same conditions as in Example III, but in the presence of 150 grams of chloroform and 0.50 gram of azoisobutyrodinitrile (0.25% on resin weight) the chlorine content of the resin reached only 60.1% after 2 hours chlorination time.

*Example V*

If chlorination is carried out at the same conditions as in Example III but in the presence of 135 grams of carbon tetrachloride and 15 grams of chloroform and with a combination of 0.04 gram of acetyl cyclohexane persulfonate (0.02% on resin weight) and 0.30 gram of dilauroyl peroxide (0.15% on resin weight) as initiator, the chlorine content of the resin reaches 64.9% within one hour.

*Example VI*

500 grams of polyvinyl chloride suspension resin are dispersed in 2000 ml. water in the presence of 300 grams of carbon tetrachloride and 0.25 gram of acetyl heptane sulfonyl peroxide (0.05% on resin weight). The suspension is kept at 40° C. under agitation and exclusion of light and chlorine gas is introduced at a flow rate of 1750 ml./min. After 1 hour the resin is filtered, washed, and dried. The chlorine content was found to be 62.1%.

*Example VII*

Example VI is repeated using 0.25 gram of acetyl hexane sulfonyl peroxide (0.05% on resin weight) and a chlorination temperature of 45° C. After 2 hours chlorination time the chlorine content of the resin reached 64.5%.

*Example VIII*

500 grams of polyvinyl chloride suspension resin dispersed in 2000 ml. of water and 500 grams of carbon tetrachloride are chlorinated at 50° C. in the dark after addition of 0.2 gram of pivalyl pentane persulfonate (as 100% active). A chlorine flow rate of 1.65 ml./min./g. polyvinyl chloride is maintained for 2 hours after which a sample is taken. After addition of another 0.2 gram of persulfonate dissolved in 10 ml. carbon tetrachloride chlorination is continued for a total of 3½ hours at the same chlorine flow rate. The sample taken after 2 hours contains about 64.5% chlorine and after 3½ hours, about 67.4% chlorine.

*Example IX*

To a dispersion of 200 grams polyvinyl chloride suspension resin in 900 ml. tetrachlorodifluoroethane (Freon 112) are added 0.1 gram of isobutyryl dodecane persulfonate. After a nitrogen purge, chlorine gas is added at such a rate that the released hydrogen chloride is essentially free of it. The temperature is gradually raised to 55° C. and maintained for 1 hour. After 1 hour chlorination under exclusion of light, the resin is filtered hot, washed on the filter with methanol, redispersed in methanol and agitated under reflux for ½ hour. The recovered resin has a chlorine content of about 63.1%.

*Example X*

To a one gallon, glass-lined pressure reactor with agitator are charged 2000 ml. of water, 500 grams of polyvinyl chloride suspension resin and 175 grams of carbon tetrachloride. After a nitrogen purge, 0.25 gram of acetyl methylcyclohexane persulfonate are added as a 2% solution in $CCl_4$. While the temperature in the reactor is raised to 50° C. chlorine gas is added until the pressure in the reactor reaches 10 p.s.i.g. The chlorine addition rate is adjusted in such a way as to maintain this pressure throughout the reaction. Chlorine addition is stopped after 1½ hours and after the pressure dropped to 2 p.s.i.g. the reactor is vented and flushed with nitrogen. The resin is filtered, washed several times with water and methanol and dried under vacuum. The chlorine content of the resin was found to be 64.0%.

*Example XI*

625 grams of polyvinyl chloride suspension resin, 2500 ml. of water and 325 grams of carbon tetrachloride are charged to a 5 liter reactor equipped with agitator, reflux condenser, gas dip tube and dropping funnel for catalyst addition. The reactor is immersed in a water bath controlled by a thermostat and is shielded from light. Gas inlet and exit are measured by flow meters and the temperature of bath and reactor is measured wtih thermocouples and a recording instrument.

The reactor charge is agitated at 80-100 r.p.m. at room temperature while the system is purged with nitrogen. Chlorine gas is then added at 1200 ml./min. to saturation as indicated by off-gas. The batch temperature is raised to 50° C. and the chlorine addition rate is adjusted so as to maintain 90 ml./min. off-gas. When the initial reaction rate diminishes, addition of catalyst solution is started. The catalyst solution is prepared by dissolving 0.32 gram of acetyl cyclohexane persulfonate in 50 grams of carbon tetrachloride. To obtain a chlorination product with 65-66% Cl within a 3 hour reaction cycle, initiator is added at such a rate as to maintain a 3°-4° C. temperature differential between batch and bath uniformly throughout the reaction. After 3 hours the reaction is stopped by an inhibitor and unused chlorine removed by a vigorous stream of nitrogen. The slurry is then subjected to steam stripping to remove and recover the swelling agent. The slurry is filtered, the granular resin washed with water, dilute sodium bicarbonate, and sodium thiosulfate solution and finally with methanol. The resin is then dried at 50° C. under reduced pressure. The chlorine content of the resins prepared in repeated experiments was found to be 65.2%, 65.3%, 65.5%, 65.5% and 66.1%.

As an indication of the unusual properties imparted to the chlorinated product, reference is made to the following tables comparing various physical properties of both chlorinated and unchlorinated polyvinyl chloride.

TABLE I

| | Unchlorinated PVC | PVC chlorinated in aqueous dispersion with acyl persulfonate initiator | PVC chlorinated in CCl$_4$ dispersion with acyl persulfonate initiator |
|---|---|---|---|
| Percent Chlorine | 56.7 | 65.5 | 65.8 |
| Intrinsic Viscosity | 1.11 | 1.03 | 1.07 |
| Heat Distortion Temp., ° C., 10 mil deflection at: | | | |
| 66 p.s.i. | | 118 | 125 |
| 132 p.s.i. | 82 | 116 | 123 |
| 264 p.s.i. | 80 | 110 | 121 |
| Particle Structure for Pore dia. .05-5 microns: | | | |
| Pore Volume, ml./g. | .294 | .280 | .313 |
| Avg. Pore dia. in microns | .60 | .72 | .62 |
| Heat Stability* (dehydrohalogenation): | | | |
| Decomposition rate, mol percent HCl/hour | .93 | .54 | .12 |
| Micromoles HCl/g. resin after 2 hours | 275 | 155 | 34 |

*0.05 mol of the polymer (3.125-4.5 grams) were placed in a 150 ml. flask. Nitrogen carrier gas was passed through concentrated sulphuric acid and over solid potassium hydroxide at 200-300 ml. per minute. The amount of hydrochloric acid released from the sample and absorbed in water was determined by change in conductance and plotted against time of heat exposure. The decomposition rate is calculated in mol percent HCl per hour from the linear part of the curve between 60-120 mins.

TABLE II

| | Unchlorinated PVC | Compounded Resin Blends (65.2-65.5% Cl) Clorinated in Aqueous Dispersion (Stabilized with 2 p.p.h. Dibutyl Tin Maleate) |
|---|---|---|
| Tensile Properties—Yield Strength p.s.i.: | | |
| Test Temp., ° C.: | | |
| 0 | 10,720±25 | 12,720±120 |
| 23 | 8,610±160 | 10,205±100 |
| 60 | 4,350±150 | 6,785±45 |
| 100 | (*) | 1,990±320 |
| —Fail Strength p.s.i.: | | |
| Test Temp., ° C.: | | |
| 0 | 9,170±130 | 10,860±280 |
| 23 | 7,640±320 | 9,210±830 |
| 60 | 5,010±300 | 7,150±340 |
| 100 | (*) | 3,760±390 |
| Flexural Properties: | | |
| Flexural Strength at 5% Outer Fiber Strain (Test Rate 2 in./min.) | 17,790±240 | 22,520±1,700 |
| Modulus in Flexure, p.s.i.×10$^{-5}$ (Test Rate 2 in./min.) | 5.54±0.16 | 5.95±0.05 |
| Creep in Tension, 23° C. (2 Samples): | | |
| Hours to Failure at Stress p.s.i.: | | |
| 7,000 | 0.5, 0.7 | 211, 273 |
| 6,500 | 1.35, 3.0 | >1,000 |
| 6,000 | 31.4, 86.5 | >1,000 |
| Water Absorption, Percent Gain: | | |
| 60° C., 24 hrs | .052 | .050 |
| 78° C., 7 days | .80 | .15 |

*Could not be tested at this temperature.

The process of the present invention is useful in the chlorination of homopolymerization products of vinyl halides, especially vinyl chloride, and the interpolymerization products of such vinyl halides with interpolymerizable essentially water-insoluble unsaturated compounds such as: vinyl esters of carboxylic acids, e.g., vinyl acetate, vinyl propionate, vinyl butyrate, vinyl stearate, vinyl benzoate, or their partially hydrolyzed products; esters of alpha,beta unsaturated monocarboxylic acids, e.g., methyl acrylate, ethyl acrylate, butyl acrylate, and the corresponding esters of methacrylic acid; nitriles, e.g., acrylonitrile, methacrylonitrile; vinylidene chloride; trichloroethylene, esters of alpha,beta unsaturated polycarboxylic acids, e.g., the methyl, ethyl, propyl, butyl, amyl, hexyl, heptyl, octyl allyl and methallyl esters of maleic, itaconic, and fumaric acids and the like. Preferably, in the case of interpolymerization products, more than 50% by weight of the mixture of monomers is a vinyl halide, and especially vinyl chloride.

While in the foregoing specification, specific compositions and procedures have been set out in considerable detail for the purpose of illustrating the invention, it will be understood that such details may be varied widely by those skilled in the art without departing from the spirit of this invention.

What is claimed is:

1. A process for preparing a chlorinated polyvinyl chloride resin comprising the step of chlorinating polyvinyl chloride in the presence of an acyl persulfonate having the structure:

$$R-SO_2-O-O-R'$$

wherein R is a saturated hydrocarbon radical of from 5 to 18 carbon atoms and R' is an acyl radical having from 2–5 carbon atoms.

2. A process for preparing a chlorinated polyvinyl chloride resin comprising the steps of chlorinating polyvinyl chloride in the presence of an acyl persulfonate having the structure:

$$R-SO_2-O-O-R'$$

wherein R is selected from the group consisting of alkyl and cycloalkyl radicals of from 5 to 18 carbon atoms and R' is selected from the group consisting of acetyl, propionyl, butyryl, and valeryl radicals.

3. A process according to claim 2 wherein said polyvinyl chloride is chlorinated as a dispersion of the resin in a chlorinated hydrocarbon swelling agent.

4. A process according to claim 2 wherein said polyvinyl chloride is chlorinated as an aqueous dispersion of the resin in the presence of a chlorinated hydrocarbon.

5. A process according to claim 2 wherein the acyl persulfonate is acetyl cyclohexane sulfonyl peroxide.

6. A process according to claim 3 wherein said dispersion is maintained at a temperature in the range of about 20° C. to about 60° C. and at a pressure not substantially greater than about 20 p.s.i.g.

7. A process according to claim 4 wherein said dispersion is maintained at a temperature in the range of about 20° C. to about 60° C. and at a pressure not substantially greater than about 20 p.s.i.g.

8. A process according to claim 2 wherein the acyl persulfonate is acetyl methyl cyclohexane persulfonate.

9. A process according to claim 2 wherein the acyl persulfonate is acetyl hexane persulfonate.

10. A process according to claim 1 wherein the acyl persulfonate is present in amounts of .01% to 0.3% by weight based on polyvinyl chloride.

No references cited.

JOSEPH L. SCHOFER, *Primary Examiner.*

J. A. DONAHUE, *Assistant Examiner.*